(12) United States Patent
Cheung

(10) Patent No.: US 6,295,544 B1
(45) Date of Patent: Sep. 25, 2001

(54) CALCULATOR FOR DETERMINING SIZES AND SPANS OF WOODEN STRUCTURAL SUPPORTS

(75) Inventor: Kevin C. K. Cheung, Beaverton, OR (US)

(73) Assignee: Western Wood Products Association, Portland, OR (US)

( * ) Notice: Subject to any disclaimer, the term of this patent is extended or adjusted under 35 U.S.C. 154(b) by 0 days.

(21) Appl. No.: 09/191,673

(22) Filed: Nov. 13, 1998

Related U.S. Application Data
(60) Provisional application No. 60/066,016, filed on Nov. 14, 1997.

(51) Int. Cl.[7] .................................................... G06F 19/00
(52) U.S. Cl. ............................................ 708/134; 708/167
(58) Field of Search .................................... 708/134, 132, 708/131, 137, 142, 167

(56) References Cited

U.S. PATENT DOCUMENTS

| | | | |
|---|---|---|---|
| 4,463,438 | * 7/1984 | Zatezalo et al. | 708/137 |
| 4,744,044 | * 5/1988 | Stover et al. | 708/132 |
| 5,042,006 | * 8/1991 | Flohrer | 708/167 |
| 5,138,566 | * 8/1992 | Comforti | 708/137 |

OTHER PUBLICATIONS

Advertisement "Construction Master II", Item #3078.
Advertisement "Construction Master III", Item #33016–C089.
Advertisement "Construction Master IV", Item #33004–C089.
Advertisement "Pocket Handyman", Item #3070.
Advertisement "Pocket Handyman III", Item #31–03.
Advertisement "Measure Master II", Item #3075 and "Professional Measure Master II," Item #3072.

\* cited by examiner

Primary Examiner—David H. Malzahn
(74) Attorney, Agent, or Firm—Stoel Rives LLP

(57) ABSTRACT

A convenient hand-held calculator includes a program stored in association with a processor for execution on the processor to compute building requirements for wooden structural supports, such as beams, headers, joists, and rafters. The program defines a series of input prompts displayed on a compact display of the calculator that lead a user through a natural sequence for acquiring information needed to perform the computations. The compact display provides the user with a constant reminder of the user-defined and calculator-generated premises upon which the computations will be made and provides a means for displaying the computed result. When the user is prompted for a numerical value input, the display indicates the expected units of the numerical value and a proposed numeric value. The proposed numeric value can then be approved by pressing an enter key of the calculator or changed by entering the desired value using numeric keys of the calculator. Certain other information or options are entered or selected by pressing one or more dedicated keys in response to a prompt. The calculator also includes a dedicated calculator key for switching between a program mode in which the program executes and a calculator mode in which the calculator operates as a simple arithmetic calculator.

16 Claims, 4 Drawing Sheets

CALCULATOR FOR DETERMINING SIZES AND SPANS OF WOODEN STRUCTURAL SUPPORTS

RELATED APPLICATIONS

This application claims the benefit of priority from U.S. Provisional Application No. 60/066,016, filed Nov. 14, 1997.

TECHNICAL FIELD

The present invention relates to the field of building technology, and, in particular, to the determination of specifications for wooden structural supports.

BACKGROUND OF THE INVENTION

The use of wooden structural supports as building components is common, particularly in the western United States. Common wooden structural supports include rafters, joists, beams, and headers (beams built-up from multiple layers of lumber). There are many factors to be considered in designing a structure using wooden supports. Among the factors are the size of the structural supports, i.e., thickness and width, and the span across which they extend. The required size depends upon the loads placed upon the structural supports, the type and grade of wood used, and the span of the structural supports. Conversely, the permissible span will depend upon the loads, the type and grade of the wood, and the size of tie structural supports. Building codes, which may specify, for example, a minimum factor of safety or a maximum designed deflection, are also a factor in determining the design and type of wood used in structural supports.

A designer can predetermine and fix several of these factors and then calculate the remaining design parameters. For example, a designer can decide tie loads that will be supported, the type and grade of the wood used, the size of the supports, and the maximum deflection permitted, then determine the maximum span possible under those conditions. Alternatively, the designer can specify a predetermined load, grade and type of wood, maximum permitted deflection, and span, then calculate the size of supports required.

Calculation of any of the above factors typically requires the use of tabulated data for the different grades and species of wood. Tabulated data of this sort is based on empirical test results obtained in accordance with ASTM standards D2555 and D245 for clear wood and ASTM D1990 for full size test specimens. For western U.S. species of wood tables are published by Western Wood Products Association, Portland, Oreg., in the *WWPA Western Lumber Product Use Manual* and by the American Forest and Paper Association, Washington, D.C., in the *AF&PA National Design Specification Supplement*. Because of the various combinations of wood types, grades, and use constraints, a large number of tables are required. Because of the complexity of the calculations and the tables, design calculations are difficult to perform in the field, for example, at a construction site.

Sophisticated computer programs for use with a general purpose personal computer or minicomputer exist for the designer of wooden structures. Such programs are typically rather complex and require the user to have a detailed knowledge of the engineering of structural designs. Furthermore, the physical size of the personal computers required to operate these computer programs is prohibitive of the use of these programs at a construction site.

SUMMARY OF THE INVENTION

An object of the invention is, therefore, to provide a method and an apparatus to allow a user on a construction site to compute sizes and spans of wooden structural supports, such as beams, headers, joints and rafters, that are comprised of various species of wood and subject to uniformly distributed loads.

Another object of the invention is to provide such a method and an apparatus that prompts the user with leading questions and that provides feedback to the user to simplify the input of information needed to compute the size or span of the structural support.

These and other objects of the invention are accomplished by a convenient hand-held calculator. The calculator includes a program stored in association with a processor. The program executes on the processor to compute building requirements for wooden structural supports, including beams, headers, joists, and rafters. The program defines a procedure for acquiring information that establishes premises on which to base the computations. A compact display is coupled to the processor to provide the user with a constant reminder of the user-defined and calculator-generated premises upon which the computations will be made and to provide a means for displaying the computed result.

The program includes a series of input prompts that lead the user through a natural sequence for obtaining the required information. The input prompts are displayed on the compact display in the form of questions or options. When the user is prompted for a numerical value input, the display indicates the expected units of the numerical value and a proposed numeric value. The proposed numeric value can then be approved by pressing an enter key of the calculator or changed by entering the desired value using numeric keys of the calculator. Certain other information or options are entered or selected by pressing a dedicated key in response to the prompt. For example, the user is given the option of computing either a span or a size of the structural support by a prompt that displays "SIZE?SPAN?." In response to the "SIZE?SPAN?" prompt, the user may direct the program to compute the size by pressing a dedicated SIZE key or to compute the span by pressing a dedicated SPAN key. Yet another type of prompt requires a user to choose from a limited number of available options. When multiple options are available, the user may scroll though the options using one or more dedicated scroll keys of the calculator then choose the desired option by pressing the enter key.

After the user has input the necessary information and options, the calculator automatically computes a desired specification result based upon the parameters and a series of equations. The specification result is then displayed on the compact display. The user can then stop or continue the execution of the program to view the ratios of stresses under the user-specified conditions to the corresponding allowable stresses. Spans and sizes computed by the calculator are normalized by the program to provide results that correspond to commercially available sizes of wooden structural supports or lumber. For expert users, the calculator includes a dedicated SET OPTIONS key that activates a subroutine for changing certain adjustment modifiers used by the program to calculate the results. Although the invention leads users easily through the design process, the user should have a basic knowledge of engineering principals and the assumptions that go into the structural calculations.

The calculator also includes a dedicated calculator key for switching between a program mode in which the program executes and a calculator mode in which the calculator operates as a simple arithmetic calculator. Arithmetic function keys labeled ÷, ×, −, +, and = are provided, along with the numeric keys, for operation in calculator mode.

Additional objects and advantages of this invention will be apparent from the following detailed description of preferred embodiments thereof which proceeds with reference to the accompanying drawings.

DETAILED DESCRIPTION OF PREFERRED EMBODIMENT

Figure 1:
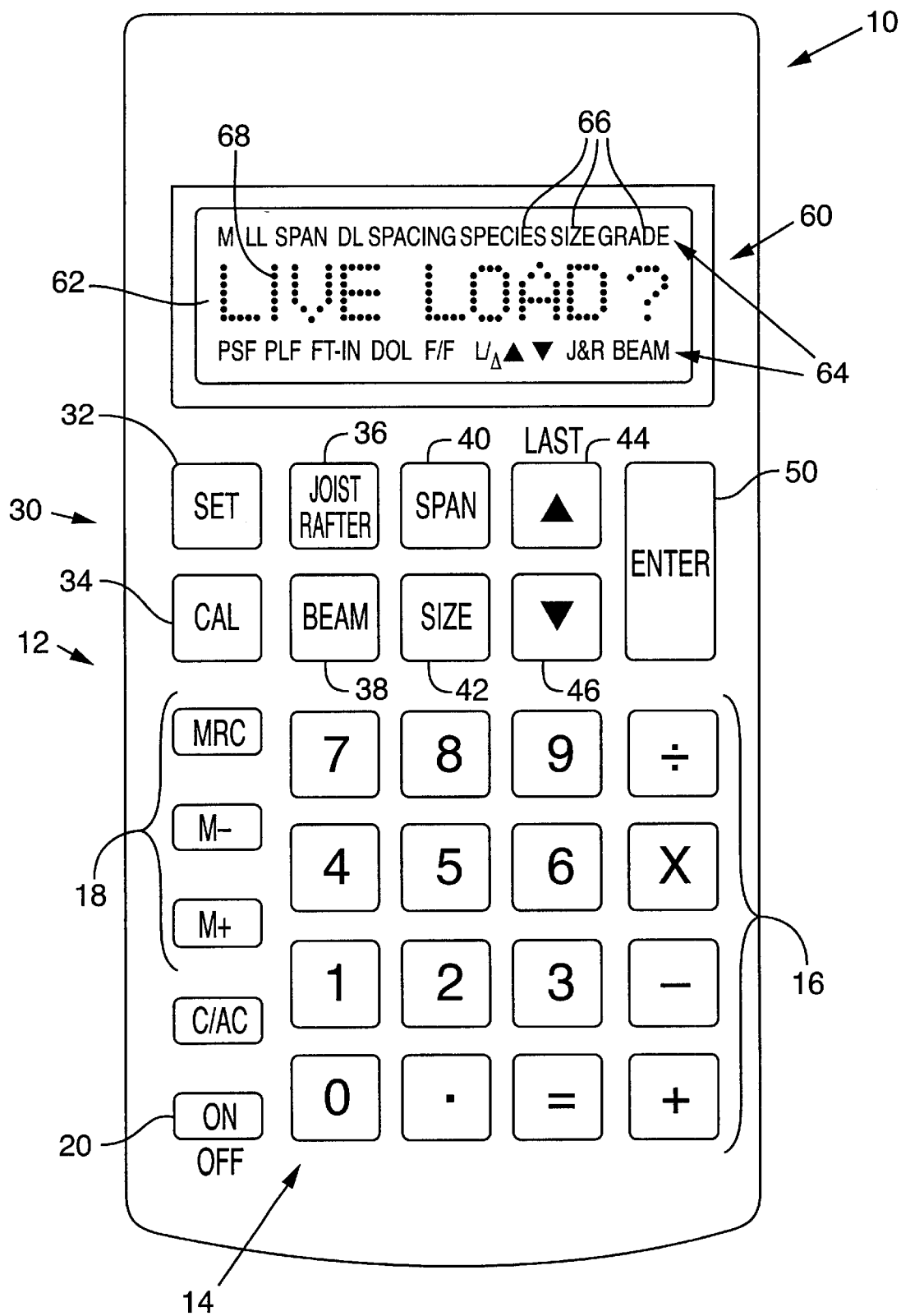
FIG. 1 is a top plan view of a calculator in accordance with the present invention.

FIG. 1 shows a top plan view of a hand-held calculator 10, in accordance with the present invention. With reference to FIG. 1, calculator 10 includes a keypad 12. Keypad 12 includes numeric keys 14 (digits 0–9) for inputting numeric data and arithmetic keys 16 (÷, ×, −, +, and =) for performing mathematical calculations, e.g., division, multiplication, subtraction, and addition, in the manner typical of known calculators. Memory function keys 18 (MRC, M−, M+) are provided in keypad 12 for performing typical memory storage and retrieval functions of known calculators. On/off key 20 is a toggle switch for turning calculator 10 on and off. Keypad 12 includes multiple dedicated keys 30, including set option key 32, calculator key 34, joist/rafter key 36, beam key 38, span key 40, size key 42, up-arrow key 44, down-arrow key 46, and enter key 50. Manually pressing calculator key 34 causes calculator 10 to switch between modes of operation that include an arithmetic calculator mode and a structural design mode that is the subject of the present invention.

A compact display 60 includes a main display 62 for displaying alphanumeric characters and a secondary display 64 for displaying messages 66. Compact display 60 is preferably a liquid crystal display unit to reduce power consumption and to reduce manufacturing costs of secondary display 64, but can be any type of conventional calculator display device. Main display 62 includes ten character units, each character unit comprised of 35 pixels arranged in a 5×7 array for displaying both numeric characters and alphabetic characters. By example, main display 62 displays the words "LIVE LOAD?", which is one of several possible input prompts 68. For illustrative purposes, FIG. 1 shows secondary display 64 with all available messages 66 displayed. However, all messages 66 will not normally be displayed at once on secondary display 64.

Figure 2:
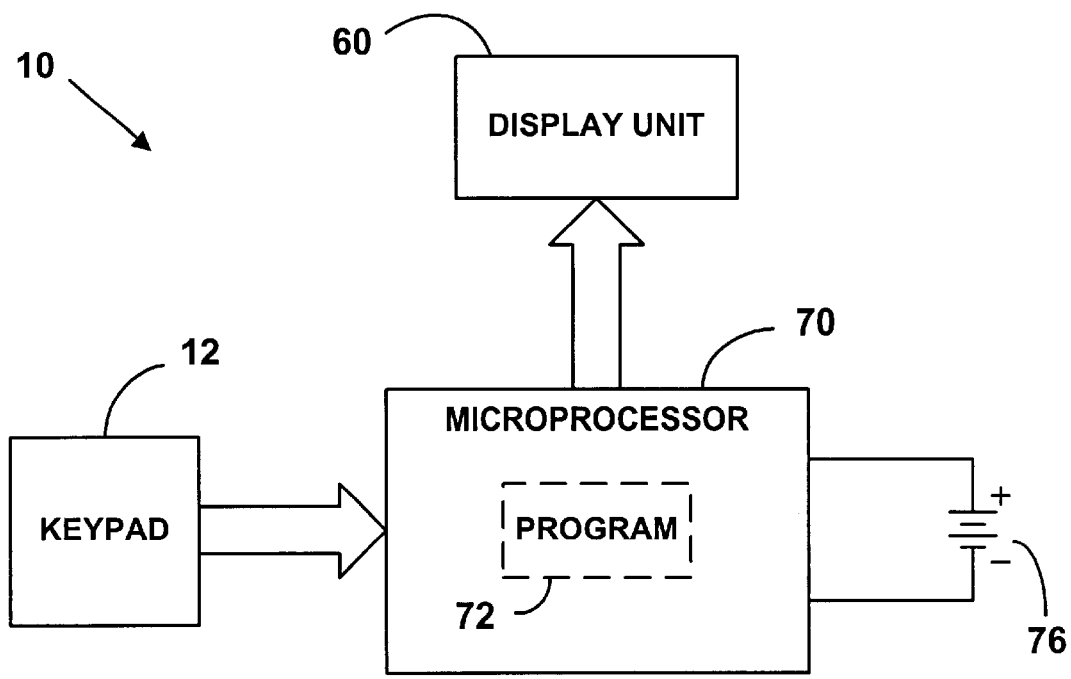
FIG. 2 is a schematic diagram of the calculator of FIG. 1.

FIG. 2 shows a schematic diagram of calculator 10. With reference to FIG. 2, calculator 10 includes a processor 70 that is preferably a microprocessor. A program 72 is stored in calculator 10 in association with processor 70 for execution on processor 70. Keypad 12 is coupled to processor 70 for manual input of data to processor 70. Processor is coupled to compact display 60 for displaying a series of input prompts 68 to a user of calculator 10 and for displaying results of computations performed by processor 70. A power source 76 is coupled to processor in the known manner. A preferred power source is a commercially available 3-volt lithium battery, type CR2032.

Figure 3:
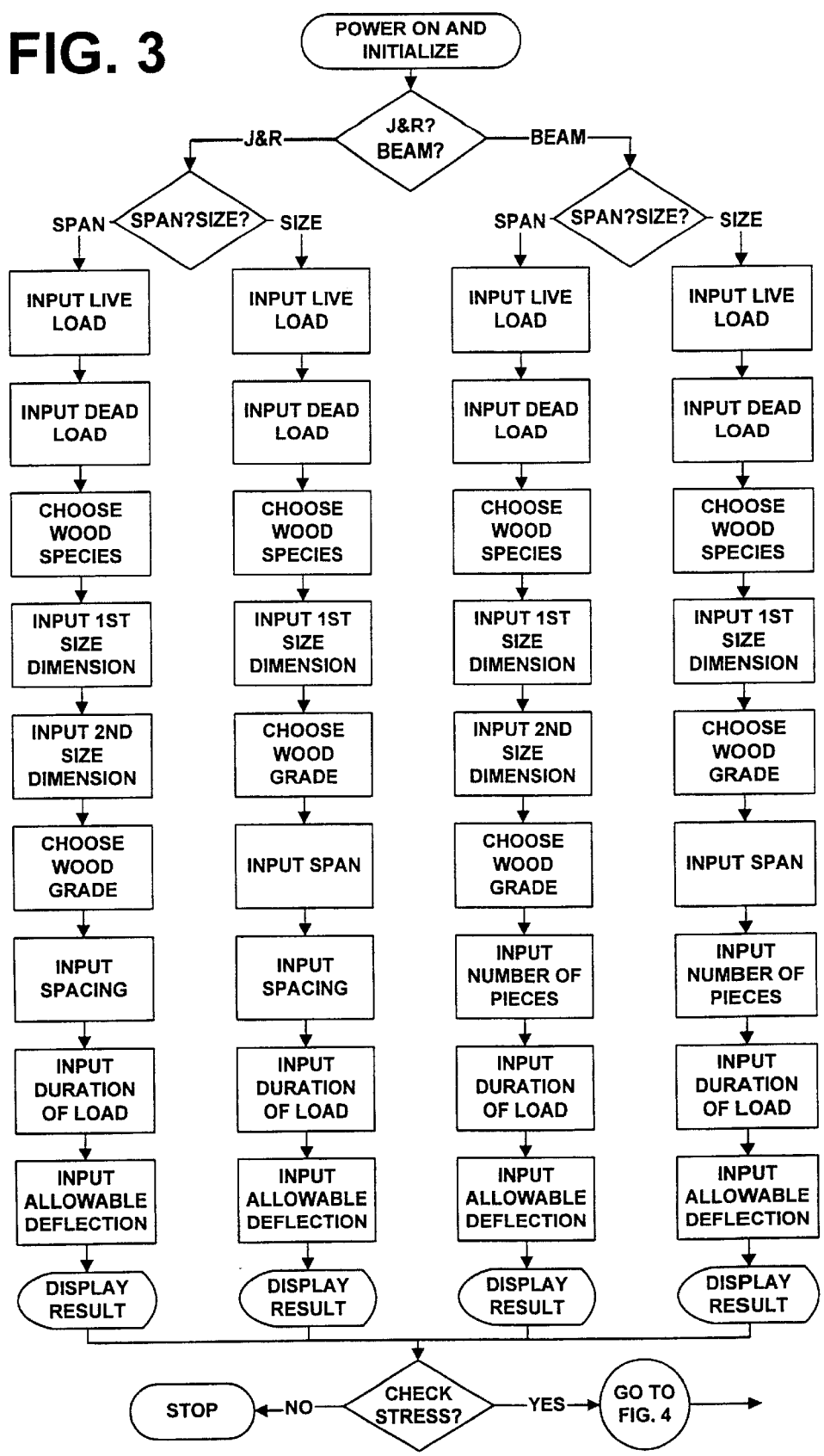
FIG. 3 is a process flow diagram outlining execution steps of a program of the calculator of FIG. 1 executed to provide a desired specification result.

FIG. 3 is a process flow diagram that depicts the sequence of operations occurring during execution of program 72 for performing structural design computations as hereinafter described. In FIG. 3, decision steps are shown with diamond shapes and parameter gathering steps are depicted with rectangular shapes. Referring to FIG. 3, program 72 is initiated by manually pressing on/off key 20. Processor 70 and program 72 then initialize and cause compact display 60 to display an input prompt 68 that reads "J&R? BEAM?" to signify to the user that a choice of structural support options must be made. The user then directs program 72 to compute structural design specifications for joists and rafters by pressing joist/rafter key 36 or to compute structural design specifications for beams and headers by pressing beam key 38. In either event, program next displays an input prompt 68 that reads "SPAN?SIZE?" to direct the user to select one of two dimensional options for execution: calculation of a maximum allowable span of the structural support or calculation of a minimum required width of the structural support.

Program 72 next gathers design parameter information via input prompts 68 displayed to the user on compact display 60. Design information may constitute numeric data or selections made from a list of choices. In the case of numeric data, the information may be input with numeric keys 14 followed by pressing enter key 50. If a list of choices is given by program 72, the user may scroll through the list of choices by pressing up-arrow and down-arrow keys 44, 46, then select from the list by pressing enter key 50. After entry via enter key 50 of the numeric data or selection from a list of choices, program 72 automatically proceeds with the subsequent step of execution. At any time during execution of program 72, the user can revert to the previous step by depressing and holding up-arrow key 44 for two seconds.

As shown in FIG. 3, the program 72 follows one series of input prompts 68 to gather design parameter information to compute the allowable span of a joist or rafter and another series of input prompts 68 for calculating the size of a joist or rafter. This is so because minimum required size dimensions are computed from a predetermined span and, conversely, the maximum allowable span is computed from a predetermined size. By way of illustration, if the user chooses to calculate the allowable span of a rafter, program 72 prompts the user to input the live load to be supported, the dead load to be supported, the wood species to be used, a first size dimension (thickness), a second size dimension (width), a wood grade, spacing between rafters, the duration of the load, and an allowable deflection. Throughout the information gathering process, program 72 limits the available choices or acceptable numeric values based on practical constraints. For example, first and second size dimensions may be specified only in integer amounts of up to 24". An attempt to input a decimal value will fail and an attempt to input a value greater than 24 will cause an error message to appear on main display 62. Although program 72 prompts for integer values corresponding to commercially available lumber size designations, i.e., 2×4, the actual standard dimensions of the lumber are used by program 72 to perform the computations. Similarly computed size dimensions will be normalized to commercially available lumber size designations. Further, the grades of wood listed in the list of choices displayed to the user will be limited by program 72 to only those grades commercially available for the particular species and size of wooden support previously input by the user. An example of wood species and grades that can be listed by program 72 are detailed below in Tables 1 and 2.

TABLE 1

PROGRAMMED
LUMBER SPECIES & GRADES
Sizes: 2" to 4" thick × 2" and wider

| Species or Group | Grade |
| --- | --- |
| * Douglas Fir-Larch<br>(Douglas Fir<br>Western Larch) | Select Structural<br>No. 1 & Better<br>No. 1<br>* No. 2<br>No. 3 |
| Douglas Fir-South<br>(Douglas Fir South) | Select Structural<br>No. 1<br>* No. 2<br>No. 3 |
| Hem-Fir<br>(Western Hemlock, Noble Fir, California<br>Red Fir, Grand Fir, Pacific Silver Fir,<br>White Fir) | Select Structural<br>No. 1 & Better<br>No. 1<br>* No. 2<br>No. 3 |
| Spruce-Pine-Fir (South)<br>(Western Species<br>Engelmann Spruce, Sitka Spruce,<br>Lodgepole Pine) | Select Structural<br>No. 1<br>* No. 2<br>No. 3 |
| Western Cedars<br>(Western Red Cedar, Incense Cedar,<br>Port Orford Cedar, Alaska Cedar) | Select Structural<br>No. 1<br>* No. 2<br>No. 3 |
| Western Woods<br>(Any of the species in the first four<br>species groups above, plus any or all<br>of the following:<br>Idaho White Pine, Ponderosa Pine,<br>Sugar Pine, Alpine Fir, Mountain<br>Hemlock) | Select Structural<br>No. 1<br>* No. 2<br>No. 3 |

* the first displayed option in ranges for species or grades

TABLE 2

PROGRAMMED TIMBER GRADES
Sizes: 5" × 5" & larger

| Species Group | Grade |
| --- | --- |
| Douglas Fir-Larch | Select Structural<br>No. 1<br>No. 2 |
| Douglas Fir-South | Select Structural<br>No. 1<br>No. 2 |
| Hem-Fir | Select Structural<br>No. 1<br>No. 2 |
| Spruce-Pine-Fir (South) | Select Structural<br>No. 1<br>No. 2 |
| Western Cedars | Select Structural<br>No. 1<br>No. 2 |
| Western Woods | Select Structural<br>No. 1<br>No. 2 |

During the information gathering steps of program 72, secondary display 64 displays messages 66 as reminders to the user, i.e., when a dimensional parameter must be entered in units of feet and inches, secondary display 64 displays "FT-IN." Other reminder messages 66 of secondary display 64 are explained in the following table:

TABLE 3

| Message | Meaning |
| --- | --- |
| M | Calculator memory in use |
| LL | Live load |
| SPAN | Span calculation |
| DL | Dead load |
| SPACING | Spacing between joists or rafters |
| SPECIES | Species of wood used |
| SIZE | Size dimension of wood used |
| GRADE | Grade of wood used |
| PSF | Load value in pounds per square foot |
| PLF | Load value in pounds per linear foot |
| FT-IN | Dimension in feet plus inches |
| DOL | Duration of load |
| f/F | Stress ratio |
| L/Δ | Maximum allowable deflection as ratio of span (L) |
| ▲▼ | Scroll keys active (up/down) |
| J&R | Joist and/or rafter calculation |
| BEAM | Beam calculation |

Messages 66 facilitate quick and accurate input of the parameters used by program 72 to perform the desired computations. Following input of the design parameter information, program 72 completes computations based upon stored computation factors, such as a horizontal shear adjustment factor (Fv), a modulus of elasticity (E) and an extreme fiber stress in bending (Fb). After computation is complete, processor 70 displays the computed design specification result on compact display 60.

Figure 4:
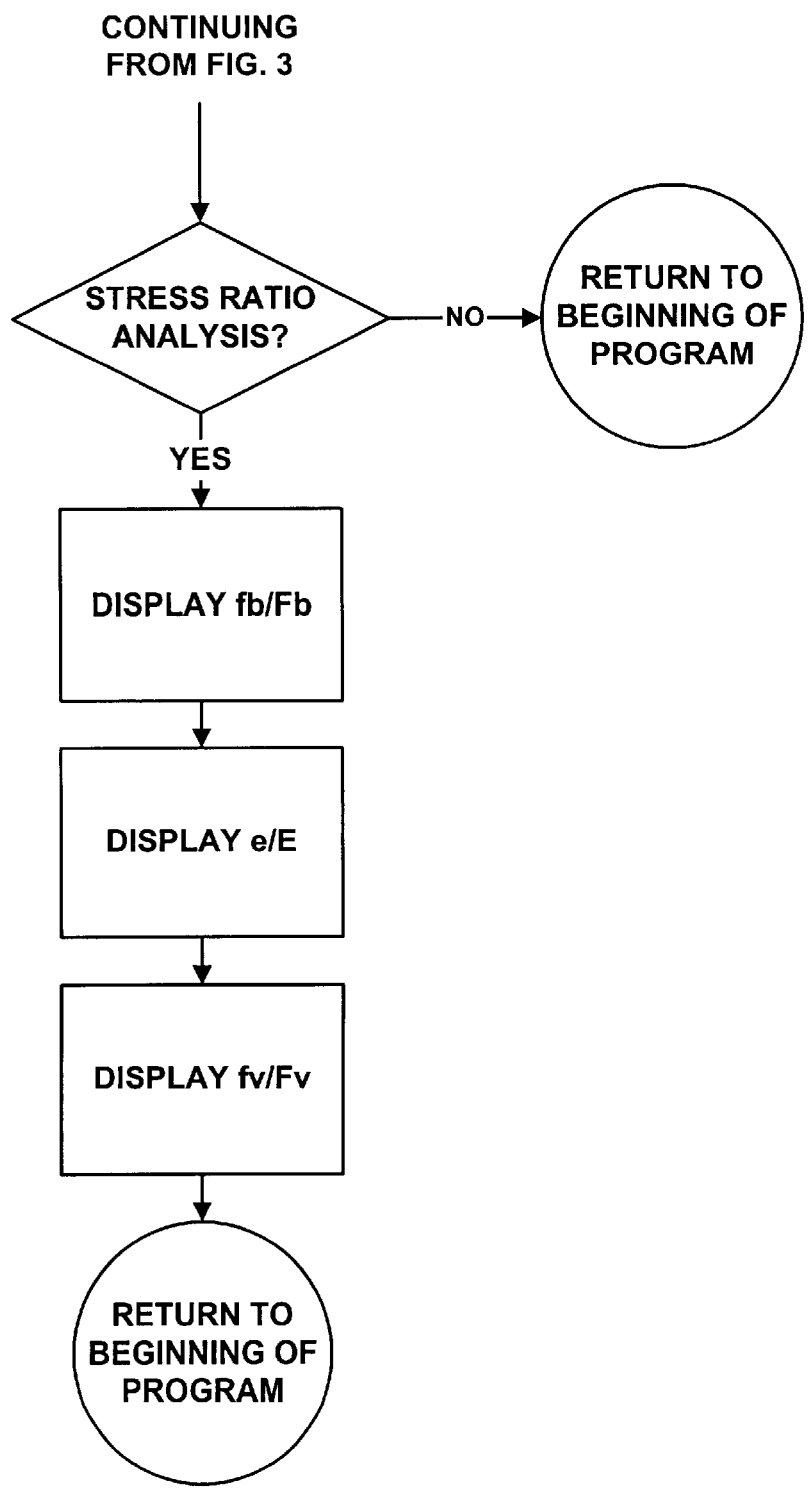
FIG. 4 is a process flow diagram that is a continuation of the process flow diagram of FIG. 3 and that outlines execution steps of the program for computing stress ratios.

FIG. 4 shows a continuation of program 72 after display of the desired specification result. With reference to FIG. 4, the user may optionally step through a display of the ratios of calculated stresses (fb, e, and fv) to the computation factors (Fb, E, and Fv) to gather critical engineering or design information.

The set options key 32, when pressed, causes program 72 to prompt the user to provide alternative computation factors, e.g., horizontal shear adjustment factor (Fv) and modulus of elasticity (e), that are different from the computation factors normally used by the program for the particular species and grade of wood selected by the user.

EXAMPLES

The following are examples of the operation of calculator 10. In examples 1 and 3–5, each of the examples begins with a list of known or selected values for parameters to be input to program 72. Example 2 is a adjustment of program 72. Examples 6 and 7 illustrate how the alternative computation factors are set.

Example 1

Floor Joist, Determine the Allowable Span

| Known: | | |
| --- | --- | --- |
| Loading: | Live Load | = 40 psf |
| | Dead Load | = 10 psf |
| | Duration of Load | = 1.00 (normal) |
| Deflection Limit: | | 1/360 of the span |
| Size & Spacing: | | 2 × 10 16" on center |
| Species & Grade: | | SPF$^s$ No. 1 |

Turn ON calculator and wait for the first Main Display prompt.

| MAIN DISPLAY | ACTION |
|---|---|
| J&R? BEAM? | Press JOIST/RAFTER key<br>Secondary display:<br>J&R |
| SPAN?SIZE? | Press SPAN key<br>Secondary display:<br>J&R, ▲▼, PSF, LL |
| LIVE LOAD? | Input 40 using numeric keys, press ENTER<br>Secondary display:<br>J&R, ▲▼, PSF, DL |
| DEAD LOAD? | Input 10 using numeric keys, press ENTER<br>Secondary display:<br>J&R, ▲▼, SPECIES |
| D Fir-L?Y | Scroll ▼ to SPF*?Y, press ENTER to accept<br>Secondary display:<br>J&R, ▲▼, SIZE |
| SIZE 2x?Y | Press ENTER to accept 2x member<br>Secondary display:<br>J&R, ▲▼, SIZE |
| 2x 10?Y | Press ENTER to accept<br>Secondary display:<br>J&R, ▲▼, GRADE |
| No. 2?Y | Scroll ▲ to No. 1?Y, press ENTER<br>Secondary display:<br>J&R, ▲▼, SPACING, IN |
| 16.0 OC?Y | Press ENTER to accept<br>Secondary display:<br>J&R, ▲▼, DOL |
| DOL 1.00?Y | Press ENTER to accept<br>Secondary display:<br>J&R, ▼▲, L/Δ |
| L/240?Y | Scroll ▲ to L/360; press ENTER<br>Secondary display:<br>J&R, ▲▼, SPAN, FT-IN |
| 14-11 | RESULT: The allowable span is 14'-11" |

Example 2

Check the Stress Ratios for Example 1

Display stress ratio percentages based on the required fb, fv, and e stresses compared to the adjusted allowable Fb, Fv, and E. To find the stress ratios for Example 1 continue from the above allowable span as follows:

| MAIN DISPLAY | ACTION |
|---|---|
| 14-11 | Scroll ▲ or ▼, or press ENTER<br>Secondary display:<br>J&R, ▲▼, f/F |
| f/F?N | To bypass the stress ratio analysis press ENTER, to continue stress ratio analysis scroll ▲ or ▼<br>Secondary display:<br>J&R, ▼, f/F |
| fb/Fb 96% | Ratio of fiber stress in bending to limit is 6%<br>Scroll ▲ or press ENTER<br>Secondary display:<br>J&R, ▲, f/F |
| e/E 100% | Ratio of elasticity to limit is 100%<br>Scroll ▲ or press ENTER<br>Secondary display:<br>J&R, ▲▼, f/F |
| fv/Fv 46% | Ratio of horizontal shear stress to limit is 46%<br>This completes the stress ratio review. User can scroll ▲, press ENTER to review and/or revise input from Example 1, or press BEAM key or JOIST/RAFTER key to begin a new problem. |

Example 3

Ceiling Joist, Determine the Required Lumber Width

Known:

| | | |
|---|---|---|
| Loading: | Live Load | = 20 psf |
| | Dead Load | = 10 psf |
| | Duration of Load | = 100 (normal) |
| Span: | | 13'-0" |
| Deflection Limit: | | L/240 of the span |
| Size & Spacing: | | 2x's 24" on center |
| Species & Grade: | | Hem-Fir No. 2 |

Turn ON calculator and wait for the first Main Display prompt.

| MAIN DISPLAY | ACTION |
|---|---|
| J&R? BEAM? | Press JOIST/RAFTER key<br>Secondary display:<br>J&R |
| SPAN?SIZE? | Press SIZE key<br>Secondary display:<br>J&R, ▲▼, PSF, LL |
| LIVE LOAD? | Input 20, using numeric keys, press ENTER<br>Secondary display:<br>J&R, ▲▼, PSF, DL |
| DEAD LOAD? | Input 10, using numeric keys, press ENTER<br>Secondary display:<br>J&R, ▲▼, SPECIES |
| D Fir-L?Y | Scroll ▲ to Hem-Fir?Y; press ENTER to accept<br>Secondary display:<br>J&R, ▲▼, SIZE |
| SIZE 2x?Y | Press ENTER to accept 2x member<br>Secondary display:<br>J&R, ▲▼, GRADE |
| No. 2?Y | Press ENTER to accept<br>Secondary display:<br>J&R, ▲▼, SPAN, FT-IN |
| SPAN? | Input 13 using numeric keys, press ENTER<br>Secondary display:<br>J&R, SPAN, FT-IN |
| 13-0 | Press ENTER to accept 0 inches<br>Secondary display:<br>J&R, ▲▼, SPACING, FT-IN |
| 16.0 OC?Y | Scroll ▲ to 24.0; press ENTER<br>Secondary display:<br>J&R, ▲▼, DOL |
| DOL 1.00?Y | Press ENTER to accept<br>Secondary display:<br>J&R, ▲▼, L/Δ |
| L/240?Y | Press ENTER to accept<br>Secondary display:<br>J&R, ▲▼, SIZE |
| 2x8 | RESULT: The required size is 2x8 |

Check stress ratios if desirable. Example 2 explains the procedure for checking stress ratios and reviewing inputs.

Example 4

Header, Determine the Required Width for Built-Up Member

This Example Includes use of C/AC Function in Conjunction with Numerical Entries Known:
| | | |
|---|---|---|
| Loading: | Live Load | = 400 plf |
| | Dead Load | = 120 plf |
| | Duration of Load | = 1.15 (Snow Live Load from roof) |
| Deflection Limit: | | L/360 of the span |
| Size & Spacing: | | 3 - 2x's 9'-8" span |
| Species & Grade: | | Douglas Fir-Larch No. 2 |

Turn ON calculator and wait for the first Main Display prompt.

| MAIN DISPLAY | ACTION |
|---|---|
| J&R? BEAM? | Press BEAM key<br>Secondary display:<br>BEAM |
| SPAN?SIZE? | Press SIZE key<br>Secondary display:<br>BEAM, ▲▼, PLF, LL |
| LIVE LOAD? | Input 400, using numeric keys, press ENTER<br>Secondary display:<br>BEAM, ▲▼, PLF, DL |
| DEAD LOAD? | Input 120, using numeric keys, press ENTER<br>Secondary display:<br>BEAM, ▲▼, SPECIES |
| D Fir-L?Y | Press ENTER to accept<br>Secondary display:<br>BEAM, ▲▼, SIZE |
| SIZE 2x?Y | Press ENTER to accept 2x member<br>Secondary display:<br>BEAM, ▲▼, GRADE |
| No.2?Y | Press ENTER to accept<br>Secondary display:<br>BEAM, ▲▼, SPAN, FT-IN |
| SPAN? | Input 9, using numeric keys, press ENTER<br>Secondary display:<br>BEAM, SPAN, FT-IN |
| 9-0 | Input 8, using numeric keys<br>Secondary display:<br>BEAM, SPAN, FT-IN |
| 9-8 | Press ENTER<br>Secondary display:<br>BEAM, ▲▼ |
| #PIECES?1 | Scroll ▲ to 3 or input 3 using numeric keys; press ENTER<br>User may want to make a note of #PIECES entered for a built-up beam. The final display provides single-member size only (and does not repeat number of pieces required).<br>Secondary display:<br>BEAM, ▲▼, DOL |
| DOL 1.00?Y | Scroll ▲ to Snow1.15?Y or input 1.5 using numeric keys<br>Secondary display:<br>BEAM, ▲▼, DOL |
| Snow1.15?Y | Press ENTER to accept<br>Secondary display:<br>BEAM, ▲▼, L/Δ |
| L/240?Y | Scroll up ▲ to L/360?Y or input 360 using numeric keys; press ENTER |
| Use of C/AC Function | The C/AC key may be used to modify numeric key pad user inputs of data for Live Load, Dead Load, or Span, when activated before to ENTER. Using C/AC in conjunction with the LAST function is not recommended for SPAN modifications<br>Secondary display:<br>BEAM, ▲▼, SIZE |
| 2x10 | RESULT: Three, 2x10's required. |

Example 5

Determine Maximum Allowable Span for a 6×12 Floor Beam

Known:
| | | |
|---|---|---|
| Loading: | Live Load | = 600 plf |
| | Dead Load | = 175 plf |
| | Duration of Load | = 1.00 (normal) |
| Deflection Limit: | | 1/360 of the span |
| Size: | | 6x12 |
| Species & Grade: | | Western Cedars No. 1 |

Turn ON calculator and wait for the first Main Display prompt.

| MAIN DISPLAY | ACTION |
|---|---|
| J&R? BEAM? | Press BEAM key<br>Secondary display:<br>BEAM |
| SPAN?SIZE? | Press SPAN<br>Secondary display:<br>J&R, ▲▼, PLF, LL |
| LIVE LOAD? | Input 600 using numeric keys; press ENTER<br>Secondary display:<br>BEAM, ▲▼, PLF, DL |
| DEAD LOAD? | Input 175 using numeric keys; press ENTER<br>Secondary display:<br>BEAM, ▲▼, SPECIES |
| D Fir-L?Y | Scroll ▼ to W Cedars?Y; press ENTER<br>Secondary display:<br>BEAM, ▲▼, SIZE |
| SIZE 2x?Y | Scroll ▲ to 6x12?Y; press ENTER<br>Secondary display:<br>BEAM, ▲▼, GRADE |
| No.2?Y | Scroll ▲ to No.1?Y; press ENTER<br>Secondary display:<br>BEAM, ▲▼ |
| #PIECES?1 | Press ENTER to accept<br>Secondary display:<br>BEAM, ▲▼, DOL |
| DOL 1.00?Y | Press ENTER to accept<br>Secondary display:<br>BEAM, ▲▼, L/Δ |
| L/240?Y | Scroll ▲ to 360?Y; press ENTER<br>Secondary display:<br>BEAM, ▲▼, SPAN, FT-IN |
| 10-1 | RESULT: The allowable span is 10'-1" |

Check stress ratios if desirable. Example 2 explains the procedure for checking stress ratios and reviewing inputs.

Set Option Examples

Example 6

Using SET OPTION to Apply Modifiers (Cx) to Fb, Fv, and/or E Values

Known:

Assume an end use where 2×? Dimension Lumber, with BASE VALUES of Fb 875, Fv 95, and E of 1,600,000 (No.2 DF-L), is used in a marine structure where it is constantly subjected to moisture content in excess of 19%.

To direct calculator to automatically adjust design values for a continuous "in-service" moisture content in excess of 19%, use the SET OPTION key as explained in this example.

Adjustments are Fb×0.85, Fv×0.97 and E×0.9. Wood design computation factors for specific conditions of end use are provided in the WWPA *Product Use Manual* and in the AF&PA *National Design Specification Supplement*.

| MAIN DISPLAY | ACTION |
| --- | --- |
| (any prompt) | Press SET OPTION |
| | Secondary display |
| | throughout this example: |
| | ▲▼ |
| FACTORS?N | Scroll ▲ or ▼ |
| Cxb 1.00?Y | Input 0.85 using numeric keys; press ENTER |
| Cxv 1.00?Y | Input 0.97, using numeric keys; press ENTER |
| Cxe 1.00?Y | Input 0.9, using numeric keys; press ENTER |
| CH?N | Press ENTER to accept |
| MSR?N | Press ENTER to accept |
| D.VALUES?N | Press ENTER to accept |
| J&R? BEAM? | At this point the designer will proceed with a design problem as per Examples 1–5. The Cx factors input in SET OPTION will remain in effect until (1) calculator is turned off or (2) SET OPTION is depressed again and the RESET? prompt is answered by pressing ENTER. See Example 10, for RESET?Y Main Display prompt instructions. |

Example 7

Using SET OPTION to Adjust Calculator Default Fv Adjustments

Known:

Calculator uses default horizontal shear (Fv) adjustment factors (CH) of 1.50 for lumber up to 2" nominal thickness and 1.33 for lumber 3" and thicker.

Assume the design being analyzed is constructed of Dimension Lumber, has been completed for an extended period of time, and that no end splits exist that are greater than one half the wide face of 2" thick lumber or the narrow face of 3" and thicker lumber.

Using the table that follows, the horizontal shear adjustment allowable would be 1.67 rather than the default 1.50. Use the SET OPTION key to make horizontal-shear design-value adjustments before beginning the problem.

Horizontal Shear Adjustment Multipliers—CH

| 2" thick lumber | 3" & thicker lumber |
| --- | --- |
| 2.00 No split | 2.00 No split |
| 1.67 ½ wide face | 1.67 ½ narrow face |
| 1.50 ¾ wide face | 1.50 ¾ narrow face |
| 1.33 1x wide face | 1.33 1x narrow face |
| 1.00 1½ wide face | 1.00 1½ narrow face |

| MAIN DISPLAY | ACTION |
| --- | --- |
| (any prompt) | Press SET OPTION |
| | Secondary display |
| | throughout this example: |
| | ▲▼ |
| FACTORS?N | Press ENTER to accept |
| CH?N | Scroll ▲ or ▼ |
| CH 1.50?Y | Input 1.67 using numeric keys;, press ENTER |
| MSR?N | Press ENTER to accept |
| D.VALUES?N | Press ENTER to accept |
| J&R? BEAM? | At this point the designer will proceed with a design problem as per Examples 1–5. The CH factor input in SET OPTION will remain in effect until (1) calculator is turned off or (2) SET OPTION is depressed again and the RESET?Y prompt is answered by pressing ENTER. See Example 10, for RESET?Y Main Display prompt instructions. |

It will be obvious to those having skill in the art that many changes may be made to the details of the above-described embodiment of this invention without departing from the underlying principles thereof. The scope of the present invention should, therefore, be determined only by the following claims.

What is claimed is:

1. A hand-held calculator for computing a safe dimensional specification of a wooden structural support, the wooden structural support to be made of a selected species of wood, comprising:

a display unit;

a processor coupled to the display unit;

multiple keys coupled to the processor for manually inputting information to the processor, the keys including multiple dedicated keys for manually inputting option data, the option data including a selected functional use configuration of a wooden structural support and a desired dimensional aspect to be calculated for the wooden structural support, the dedicated keys thereby simplifying the input of the option data;

a program stored in the calculator for execution on the processor to:

(i) display on the display unit a series of prompts that guide a user to input by the keys the information and the option data, the series of prompts including a load prompt for guiding the user to input a maximum anticipated load to be supported by the wooden structural support, a wood species prompt for guiding the user to input a selected species of wood, and a known dimension prompt for guiding the user to input a predetermined dimensional parameter of the wooden structural support, (ii) calculate a safe dimensional specification corresponding to the desired dimensional aspect and based upon the selected functional use configuration, the maximum anticipated load, the selected species of wood, and the predetermined dimensional parameter, and (iii) display on the display unit the safe dimensional specification.

2. The hand-held calculator of claim 1 in which the option data directs the program to compute a span of the wooden structural support and the known dimension prompt guides the user to input a selected commercially available lumber size designation of the structural support.

3. The hand-held calculator of claim 2 in which the program converts the selected commercially available lumber size designation to a corresponding actual standard size, and the calculation of the safe dimensional specification is based on the actual standard size.

4. The hand-held calculator of claim 3 in which the wood species prompt displays on the display unit only those species of wood that are commercially available in the selected commercially available lumber size designation.

5. The hand-held calculator of claim 1 in which:

the option data directs the program to compute a size of the wooden structural support based on a predetermined span of the structural support;

the series of prompts includes a span prompt for guiding the user to input the predetermined span of the structural support;

the program includes a normalizing function that calculates a minimum commercially available standard lumber size that meets the safe dimensional specification; and the displaying of the safe dimensional specification includes displaying the minimum commercially available standard lumber size.

6. The hand-held calculator of claim 1 in which the display unit displays messages during the execution of the program to indicate a status of the program.

7. The hand-held calculator of claim 1 in which the display unit displays a unit indicator to indicate to the user the unit of measurement of the information to be input by the user.

8. The hand-held calculator of claim 1, further comprising a set of engineering computation factors stored in the calculator for each of various species of wood selectable by the user, and in which the program calculates the safe dimensional specification based on the stored set of engineering computation factors corresponding to the selected species of wood.

9. The hand-held calculator of claim 8 in which the set of engineering computation factors includes a horizontal shear adjustment factor, a modulus of elasticity, and an extreme fiber stress in bending.

10. The hand-held calculator of claim 9 in which:

the program further calculates a maximum stress on the wooden structural support based on the maximum anticipated load and the safe dimensional specification;

calculates a ratio of the maximum stress to one of the engineering computation factors corresponding to the maximum stress; and displays on the display unit the ratio of the maximum stress to the engineering computation factor.

11. The hand-held calculator of claim 9 in which the dedicated keys include a set options key that, when pressed, causes the program to prompt the user to input a set of alternative computation factors that are different from the stored set of engineering computation factors.

12. The hand-held calculator of claim 1 in which the selected functional use configuration is a beam.

13. The hand-held-calculator of claim 1 in which the selected functional use configuration is a joist.

14. The hand-held calculator of claim 1 in which the wood species prompt includes a wood grade prompt that prompts the user to input a grade of the selected species of wood.

15. The hand-held calculator of claim 1 in which the load prompt guides the user to input a maximum anticipated live load, a maximum anticipated dead load, and a loading duration.

16. The hand-held calculator of claim 1, further comprising an arithmetic calculator, and in which the keys of the hand-held calculator include a mode selection key that, when depressed, toggles the hand-held calculator between an arithmetic calculator mode for performing arithmetic calculations and a structural design mode for computing safe dimensional specifications of wooden structural supports.

* * * * *

UNITED STATES PATENT AND TRADEMARK OFFICE
CERTIFICATE OF CORRECTION

PATENT NO.    : 6,295,544 B1                                                    Page 1 of 1
DATED         : September 25, 2001
INVENTOR(S)   : Kevin C. K. Cheung It is certified that error appears in the above-identified patent and that said Letters Patent is hereby corrected as shown below:

Column 7,
Line 58,

| e/E 100% | Ratio of elasticity to limit is 100% |
| | Scroll ▼ or press ENTER |
| | *Secondary display:* |
| | J&R, ▼, f/F |

| fv/Fv 46% 46% | Ratio of horizontal shear stress to limit is |
| | This completes the stress ratio review. User can scroll ▼, press ENTER to review and/or revise input from *Example 1*, or press BEAM key or JOIST/RAFTER key to begin a new problem.--. |

Column 8,
Line 13, "100" should read -- 1.00 --.
Line 40,

"D Fir-L?Y           Scroll ▲ to Hem-Fir?Y; press"

should read

--D Fir-L?Y          Scroll ▼ to Hem-Fir?Y; press--.

Column 14,
Line 26, "hand-held-calculator" should read -- hand-held calculator --.

Signed and Sealed this

Twenty-sixth Day of August, 2003

JAMES E. ROGAN
*Director of the United States Patent and Trademark Office*